(12) United States Patent
Hibino et al.

(10) Patent No.: US 10,037,181 B2
(45) Date of Patent: Jul. 31, 2018

(54) IMAGE FORMING APPARATUS, IMAGE FORMING METHOD, AND IMAGE FORMING SYSTEM WITH REWRITABLE PRINT AND PERMANENT PRINT FUNCTION

(71) Applicants: KABUSHIKI KAISHA TOSHIBA, Tokyo (JP); TOSHIBA TEC KABUSHIKI KAISHA, Tokyo (JP)

(72) Inventors: Makoto Hibino, Shizuoka-ken (JP); Kengo Yaoi, Shizuoka-ken (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/135,862

(22) Filed: Apr. 22, 2016

(65) Prior Publication Data
US 2016/0239247 A1    Aug. 18, 2016

Related U.S. Application Data

(63) Continuation of application No. 13/337,441, filed on Dec. 27, 2011, now Pat. No. 9,348,546.
(Continued)

(30) Foreign Application Priority Data

Dec. 22, 2011 (JP) ................. 2011-280811

(51) Int. Cl.
G06F 3/12 (2006.01)
G06K 15/02 (2006.01)
G06K 15/00 (2006.01)

(52) U.S. Cl.
CPC .......... G06F 3/1281 (2013.01); G06F 3/1205 (2013.01); G06F 3/1253 (2013.01);
(Continued)

(58) Field of Classification Search
CPC .... B41J 3/546; G03G 15/5029; G06F 3/1281; G06F 2206/1514
See application file for complete search history.

(56) References Cited

U.S. PATENT DOCUMENTS 7,024,152 B2  4/2006 Lofthus et al.
7,136,616 B2  11/2006 Mandel et al.
(Continued)

FOREIGN PATENT DOCUMENTS

JP   2000-246999 A   9/2000
JP   2004-260852 A   9/2004
(Continued)

*Primary Examiner* — Christopher D Wait
(74) *Attorney, Agent, or Firm* — Foley & Lardner LLP

(57) ABSTRACT

According to one embodiment, an image forming apparatus includes an image forming job created and transmitted by an job creation unit including an image to be printed, a receiving unit that receives a request of print setting to the image, a display unit that displays a setting screen having a setting unit to designate a setting of rewritable print or permanent print per page in response to receive the request of print setting, a memory unit that stores the setting of rewritable print or permanent print per page set by operating the setting screen, in addition to the image as the image forming job, and an image forming unit that receives the image forming job from the job creation unit and forms images on a sheet based on the setting in the image forming job.

18 Claims, 14 Drawing Sheets

Related U.S. Application Data

(60) Provisional application No. 61/428,328, filed on Dec. 30, 2010, provisional application No. 61/428,331, filed on Dec. 30, 2010.

(52) U.S. Cl.
CPC ....... *G06K 15/005* (2013.01); *G06K 15/1886* (2013.01); *G06F 3/1219* (2013.01); *G06F 3/1285* (2013.01); *G06F 2206/1514* (2013.01)

(56) References Cited

U.S. PATENT DOCUMENTS

| | | | |
|---|---|---|---|
| 7,206,532 B2 | 4/2007 | Lofthus et al. | |
| 8,330,992 B2 | 12/2012 | Kuroda | |
| 8,395,810 B2 | 3/2013 | Kanai | |
| 2008/0261143 A1* | 10/2008 | Yamashita | G03G 15/0121 430/125.3 |
| 2010/0033736 A1* | 2/2010 | Triplett | G06F 3/1205 358/1.9 |
| 2010/0046013 A1* | 2/2010 | Bonikowski | B41J 2/0057 358/1.9 |
| 2010/0118338 A1* | 5/2010 | Sakiyama | H04N 1/00411 358/1.15 |
| 2010/0272449 A1* | 10/2010 | Yoshida | H04N 1/32133 399/2 |
| 2011/0007355 A1 | 1/2011 | Hibino | |
| 2011/0012969 A1* | 1/2011 | Brewington | B41J 3/546 347/101 |

FOREIGN PATENT DOCUMENTS

| | | |
|---|---|---|
| JP | 2006-060662 A | 3/2006 |
| JP | 2009-301191 A | 12/2009 |
| JP | 2010-016647 A | 1/2010 |
| JP | 2010-125677 A | 6/2010 |

\* cited by examiner

IMAGE FORMING APPARATUS, IMAGE FORMING METHOD, AND IMAGE FORMING SYSTEM WITH REWRITABLE PRINT AND PERMANENT PRINT FUNCTION

CROSS-REFERENCE TO RELATED APPLICATION

The present application is a continuation application of U.S. application Ser. No. 13/337,441, filed Dec. 27, 2011, which is based upon and claims the benefit of priority from: U.S. provisional application 61/428,331, filed on Dec. 30, 2010; U.S. provisional application 61/428,328, filed on Dec. 30, 2010; and JP application No. 2011-280811, filed on Dec. 22, 2011; the entire contents of each of which are incorporated herein by reference.

FIELD

The description relates to an image forming apparatus and image forming method forming an image using decolorable colorant and anti-decolorable colorant.

BACKGROUND

Conventionally, there exists a decolorable colorant capable of erasing colors with chemical reaction of heat or the like. An image forming apparatus having an image forming unit forming images with the decolorable colorant and another image forming unit forming images with anti-decolorable colorant, normal colorant is known.

However, there is no image forming apparatus and image forming method that can form an image by decolorable colorant and an image by anti-decolorable colorant.

DETAILED DESCRIPTION

Hereinafter, embodiments will be described with reference to the drawings.

First Embodiment

Figure 1:
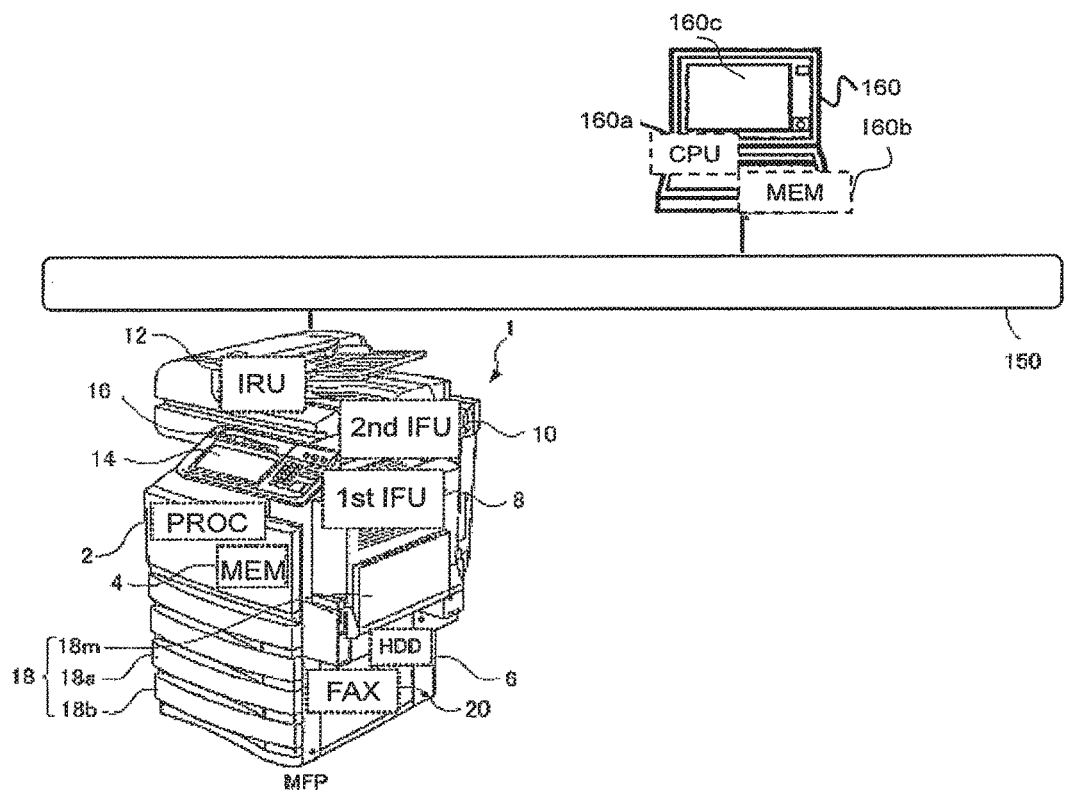
FIG. 1 is a diagram showing the configuration of an image forming apparatus according to a first embodiment and the configuration of a system including the image forming apparatus.
Figure 2:
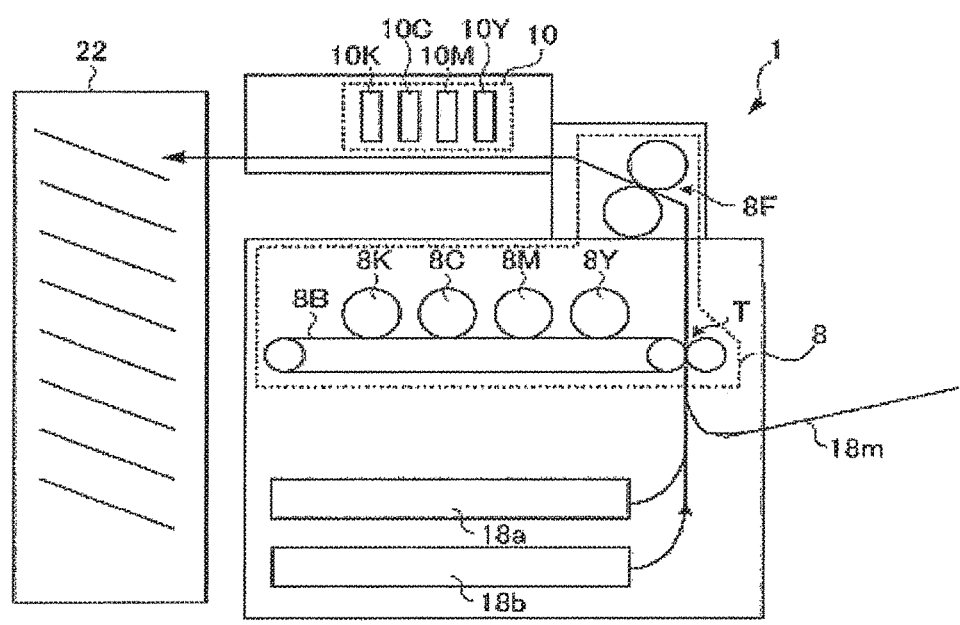
FIG. 2 is a diagram showing the configuration of the MFP 1 according to the first embodiment.

FIG. 1 is a diagram showing the configuration of an MFP (Multi-Function Peripheral) 1 serving as an image forming apparatus according to the present embodiment and the configuration of a system including the MFP 1. FIG. 2 is a diagram showing the configuration of the MFP 1 according to the present embodiment. The system of the present embodiment has a configuration in which the MFP 1 and other devices such as a client terminal 160 are connected via a network 150. The client terminal 160 is not limited to desk-top type computers, and it could be any mobile computing devices such as mobile computers, tablet-type computers, and smartphones or the like, which could be connected via wireless communications with the MFP 1. Each device constituting the system will be described in detail below.

The MFP 1 of the present embodiment is an MFP capable of performing two kinds of image forming processes: one image forming process uses a decolorable colorant which becomes colorless by a chemical reaction when it is heated to a predetermined temperature, and the other image forming process uses a non-decolorable (or anti-decolorable) colorant which maintains its color even after it is heated to the predetermined temperature. In the following, an image forming with a decolorable colorant will be referred to as a "rewritable print" (however, the image forming process using the decolorable colorant is not limited to the case of aiming at the reuse of the sheet). An image forming with a anti-decolorable colorant will be referred to as a "permanent print"

The MFP 1 includes a processor 2, a memory 4, an HDD (Hard Disc Drive) 6, a first image forming unit 8 that forms images using a non-decolorable colorant, a second image forming unit 10 that forms images using a decolorable colorant, an image reading unit 12, a display panel 14, an operation input unit 16, a sheet supply unit 18, a FAX unit 20, a finisher device 22 (discussed later), and the like.

The processor 2 executes various processes of the MFP 1 such as, for example, an image forming process and an image reading process, based on a print job, an operation input, and the like sent from the client terminal 160 or the like. In case there are an image to be formed with decolorable colorant and an image to be formed with anti-decolorable colorant in a single job (or a single page), the processor 2 of the present embodiment controls a process of causing the first image forming unit 8 to form the image on a sheet using the non-decolorable colorant and causing the second image forming unit 10 to form the image on the sheet using a decolorable colorant. The processor 2 executes processing for realizing these various functions by executing a program stored in the memory 4.

Details of the function executing the above-described processes will be described with reference to the functional block diagram of FIG. 3. Moreover, as the processor 2, a CPU (Central Processing Unit), an MPU (Micro Processing Unit) capable of executing the same arithmetical processing as the CPU, and the like can be used. Furthermore, a part or the entirety of the functions of the MFP 1 may be implemented as an ASIC (Application Specific Integrated Circuit) serving as a processor.

The memory 4 stores programs for executing the image forming process and the above-described processes of the MFP 1 according to the present embodiment. Moreover, the memory 4 is used for temporarily storing image data generated by RIP processing during the image forming process and as work areas of various applications. In addition, the memory 4 has a function of temporarily storing signals such as an image forming job acquired via the network 150, operation input signals from the operation input unit 16, and the like. The memory 4 can be configured, for example, by a RAM (Random Access Memory), a ROM (Read Only Memory), a DRAM (Dynamic Random Access Memory), an SRAM (Static Random Access Memory), a VRAM (Video RAM), a flash memory, and the like.

The HDD 6 is an auxiliary storage device for storing various kinds of information of the MFP 1. Although in the present embodiment, an HDD is exemplified as an example of the auxiliary storage device of the MFP 1, the auxiliary storage device is not limited to this, but for example, a flash memory, an SSD (Solid-State Device), a magnetic disk other than the HDD, and the like may be used.

The first image forming unit 8 is a device that forms images by a general electrophotographic method. The first image forming unit 8 of the present embodiment forms an image designated to be formed with anti-decolorable colorant. As shown in FIG. 2, the first image forming unit 8 includes photoconductive drums 8K, 8C, 8M, and 8Y, an intermediate transfer belt 8B, a fixing device 8F, and the like.

The photoconductive drums 8K to 8Y form electrostatic latent images corresponding to color data of each of the colors black (K), cyan (C), magenta (M), and yellow (Y) constituting the image data to be formed on the photoconductive surface of each of the photoconductive drums 8K to 8Y, and the electrostatic latent images are made visible as developer images by a developer (toner) supplied from a developing roller not shown. The developer images formed on the photoconductive drums 8K to 8Y are transferred (so-called primarily transferred) to the intermediate transfer belt 8B.

The intermediate transfer belt 8B transfers (so-called secondarily transfers) the transferred developer images to a sheet serving as an image forming target at a transfer position T shown in FIG. 2.

The fixing device 8F thermally fixes the developer images transferred to the sheet at the transfer position T to the sheet. At this moment, the heat fixing is performed at, for example, about 150° C. (degree Celsius).

The second image forming unit 10 is a device that forms images by an ink jet method using a decoloring ink which is a decolorable colorant. In the present embodiment, the second image forming unit 10 forms an image acquired as an image forming for rewritable print. The second image forming unit 10 includes print heads 10K, 10C, 10M, and 10Y which correspond to the decoloring inks of each of the colors black (K), cyan (C), magenta (M), and yellow (Y), and corresponding inks are discharged from the print heads so that decoloring ink images are formed on a sheet.

Here, the decoloring ink which is a decolorable colorant may be a dye such as a leuco dye. The decoloring ink becomes colorless when it is heated to a temperature of about 80 to 100° C. The sheet on which the image is fixed by fixing device 8F at 150° C. is conveyed to the second image forming unit 10 and is cooled down to about 60° C. during the conveyance. A cooling device such as a cooling fan can be installed in the paper path between the fixing device 8F and the second image forming unit 10.

The image reading unit 12 is a general image reading device which is provided to a copying machine, an image scanner, and the like. The image reading unit 12 is used when a user copies or scans an original document using the MFP 1.

The display panel 14 displays various kinds of information such as setting information, operation status, and the like of the MFP 1. The display panel 14 can be configured, for example, by an electronic paper, an LCD (Liquid Crystal Display), an EL (Electronic Luminescence), a PDP (Plasma Display Panel), a CRT (Cathode Ray Tube), and the like. Moreover, when the display panel 14 is configured by a touch panel display, the display panel 14 can implement a part or the entirety of the functions of the operation input unit 16.

The operation input unit 16 is used for designating copying and scanning conditions and inputting FAX Numbers. The operation input unit 16 can be configured, for example, by input keys for numbers or the like, a keyboard, a mouse, a touch panel, a touchpad, a graphics tablet, and dedicated buttons.

The sheet supply unit 18 stores sheets such as papers on which an image is formed and supplies the stored sheet to the image forming unit when forming images. The sheet supply unit 18 of the present embodiment includes a sheet supply unit 18a in which unused sheets on which an image is not formed yet at all are stored, a reused sheet supply unit 18b in which reused sheets are stored which have been subjected to a decoloring process for reuse so that images disappear, and a manual supply unit 18m.

The FAX unit 20 is an apparatus that sends and receives facsimile signals in the MFP 1.

The finisher device 22 is a device for sorting sheets into each copy when printing multiple copies. Moreover, the finisher device 22 is also capable of performing the role of a discharge unit that stores discharged sheets.

The configuration of the MFP 1 was described hereinabove.

Next, other system configurations shown in FIG. 1 other than the MFP 1 will be described. The network 150 is a communication network that is configured, for example, by the Internet, a LAN (Local Area Network), and a WAN (Wide Area Network).

The client terminal 160 connected to the network 150 outputs an image forming job such as a PDL file to the MFP 1 via the network 150. The client terminal 160 is a terminal device such as a computer. The client terminal 160 includes a processor 160a, a memory unit 160b, and the like, and is capable of realizing various functions by executing programs stored in the memory 160b or the like. The client terminal 160 further has a display 160c that displays GUI (Graphical User Interface) and the like and users can create an image forming job or perform various settings by operations with a mouse and a keyboard.

Next, the image forming function of the MFP 1 according to the present embodiment will be described.

First, among the image forming processes of the MFP 1 according to the present embodiment, an image forming process based on an image forming job will be described. FIG. 3 is a functional block diagram showing functional blocks of the MFP 1. The functional blocks below are implemented when the processor 2 reads and executes image forming programs stored in the memory 4 and the HDD 6.

The MFP 1 of the present embodiment includes a print job acquiring unit 102, an RIP unit 104, a setting information determining unit 106, a sheet supply control unit 108, an image reading sensor control unit 110, a first image forming unit control unit 112, and a second image forming unit control unit 114.

The print job acquiring unit 102 acquires an image forming job that instructs to form images and that is sent from the client terminal 160 or the like via the network 150. The print job may contain the following information: a PDL (Page Description Language) file based on which an image is formed, setting information designating to perform permanent print or rewritable print, setting information as to from which supply unit of the sheet supply unit 18 a sheet will be supplied, setting information designating to perform full color or monochrome (black & white) image forming and the like.

The RIP unit 104 is an RIP (Raster Image Processor) that executes a process of interpreting a PDL file constituting the print job and converting the PDL file into raster image data. The RIP unit 104 outputs the raster image data set for permanent print to the first image forming control unit 112 and outputs the raster image data set for rewritable print to the second image forming control unit 114.

The setting information determining unit 106 determines if there is an image data set to be formed by rewritable print in the image forming job received by the MFP 1. That is to say, if the image forming job includes the image data set to be formed by rewritable print, the setting information determining unit 106 judges the image forming job includes the rewritable print image data and instructs the RIP unit 104 to output the image data designated to be formed by the rewritable print to the second image forming control unit 114.

If the image forming job does not include the image data set to be formed by rewritable print, the setting information determining unit 106 judges the image forming job does not include the rewritable print image data and instructs the RIP unit 104 to output the image data designated to be formed by the permanent print to the first image forming control unit 112. Moreover, when it is preset by an operation input on the operation input unit 16 or the like such that images will be formed by rewritable print, the setting information determining unit 106 may similarly determine that images will be formed by rewritable print and cause the raster image data to be output to the second image forming unit control unit 114.

Furthermore, the setting information determining unit 106 determines whether it is set such that a sheet will be supplied from either the sheet supply unit 18*a*, the reused sheet supply unit 18*b*, the manual sheet supply unit 18*m*, or anything (Auto).

The sheet supply control unit 108 performs sheet supply from designated sheet supply unit based on the setting information related to sheet supply unit 18. In a case that auto is set as sheet supply source, for example, if there is a page set to be formed with full color and permanent print, the sheet supply control unit 108 instructs the sheet supply unit 18*a* to supply a sheet for the page. In other print settings, the sheet supply control unit 108 instructs the reused sheet supply unit 18*b* to supply a reused sheet for the page.

When the rewritable print is designated, the second image forming unit control unit 114 executes a process of causing the second image forming unit 10 to form the raster image data generated by the RIP unit 104 with a decoloring ink which is a decolorable colorant.

By the above-described functions of the MFP 1 according to the present embodiment, the MFP1 can perform image forming of the image data having a part to be formed by rewritable print and a part to be formed by permanent print in an image forming job.

FIG. 4 through FIG. 8 show setting screens to create an image forming job, which are displayed in the display 160*c* of the client terminal 160. FIG. 9 is a flowchart showing the flow of image forming process of the MFP 1. With reference to the FIG. 4 to FIG. 9, creating of an image forming job having a mixture of a data for rewritable print and a data for permanent print will be explained.

Figure 4:
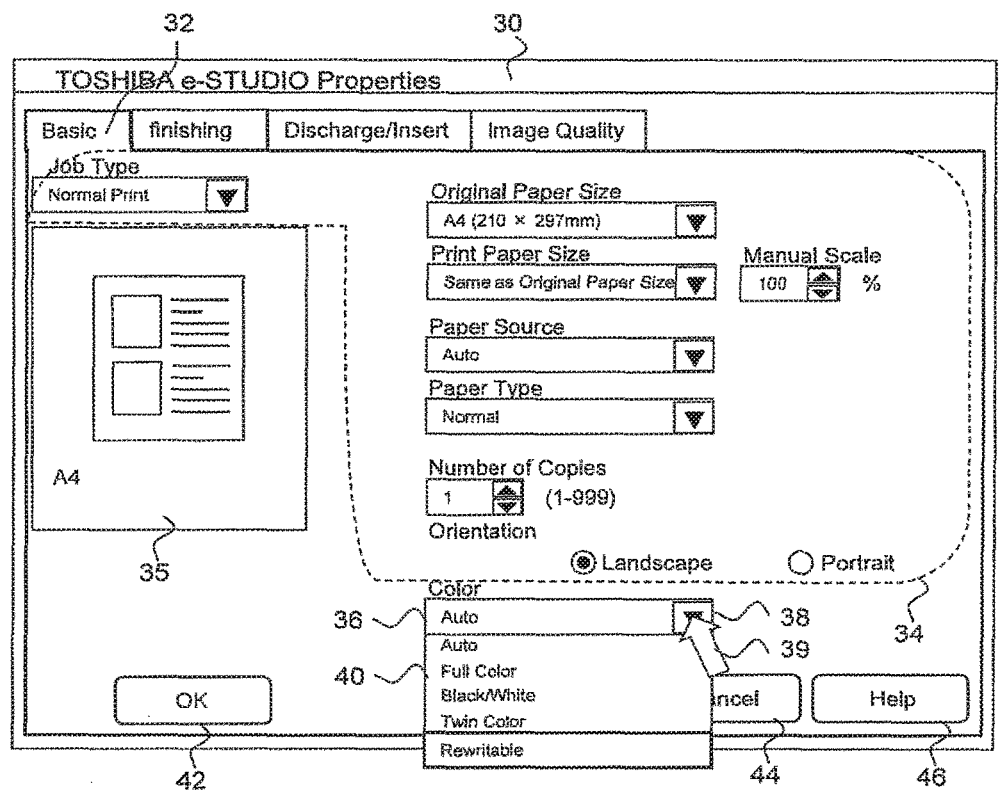
FIG. 4 is an outline view of printer driver 30 according to the first embodiment.

FIG. 4 shows a printer driver 30 activated for creating an image forming job for an image prepared by some applications. Upon receipt of instruction from a user, the client terminal 160 displays the printer driver 30 on the display 160*c*. The printer driver 30 receives various settings through an operation with a mouse and a keyboard by the user.

The printer driver 30 has a basic tab including setting buttons for job type, original sheet size, print sheet size, scale rate, media type, number of copies, orientation, color, and the like, and including a window 35 displaying various settings set for preview.

A finishing tab includes setting buttons for duplex print, stapling, punching, and the like. A discharge/insert tab includes setting buttons for where to discharge, insertion sheet, and the like. A image quality tab has setting buttons related to image quality. Each tab comes in front for setting by operating and selecting the tab with a mouse or a keyboard.

The basic tab 32 in the printer driver 30 has a color setting unit 36 to set a color of image forming. The color setting unit 36 has a color setting button 38 to be selected by a user operation with a mouse or keyboard. For example, there may be a method that the user moves a cursor 39 of the mouse over the color setting button 38 and clicks the mouse. The user may use arrow buttons on the keyboard to move the selection sign on the color setting button 38 and hit a enter button on the keyboard.

After operation of the color setting button 38, the color setting unit 36 shows a dropdown list 40. The dropdown list 40 has items such as auto in which color setting is set in accordance with the image forming job prepared with the application software, full color, monochrome (black & white or grayscale), twin color, and rewritable. The printer driver 30 receives a color setting as a designated color in image forming, which is selected by a user operation with the mouse and keyboard. FIG. 4 indicates a situation where the user selects rewritable print for the color setting. After operating the color setting button 38 again with the rewritable print selected, the color setting unit 36 finishes showing the dropdown list 40 and indicates rewritable print is set.

Further, the printer driver 30 has a OK button 42, a cancel button 44, and a help button 46. After operating the OK button 42 by the user, the client terminal 160 stores print settings in the memory unit 160*b*, ends the printer driver 30, and transit to a waiting mode for print request. Subsequently, upon a user instruction of print request, the client terminal 160 transmits the image forming job to the MFP 1. After operating the cancel button 42 by the user, the client terminal 160 ends the printer driver 30 without storing print settings. After operating the help button 46 by the user, client terminal 160 displays detail information and explanation for the various settings the display 160*c*.

Figure 5:
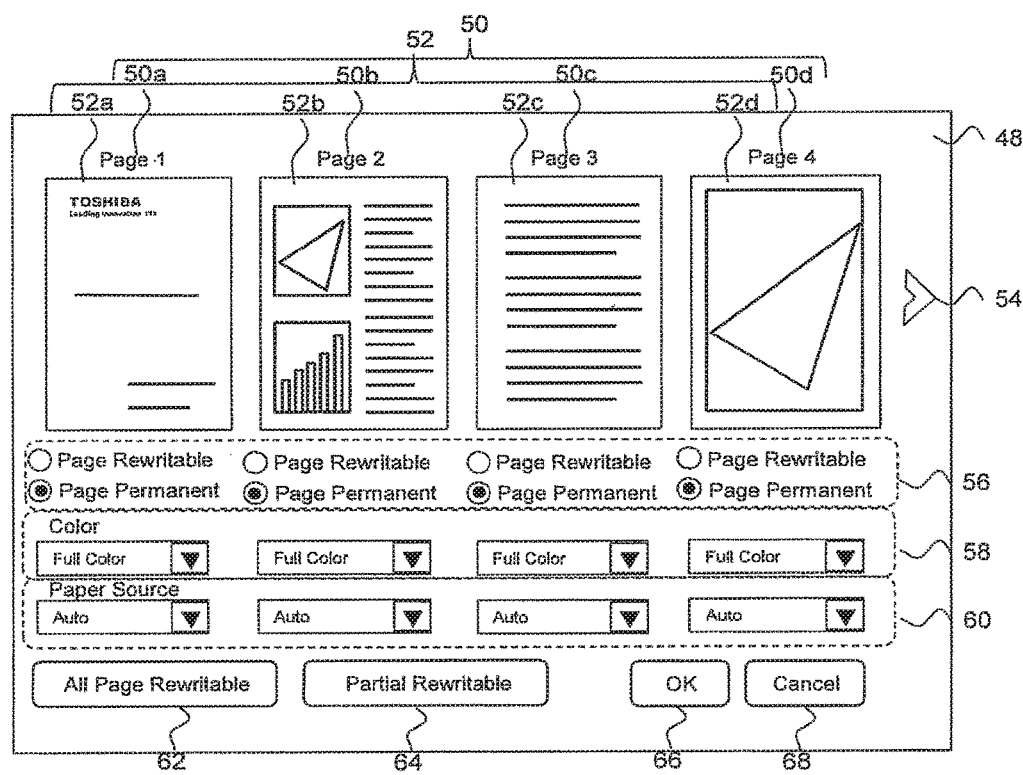
FIG. 5 is an outline view of rewritable setting screen 48 according to the first embodiment.

After the rewritable print setting is indicated in the color setting unit 36, the client terminal 160 stores print setting set with the printer driver 30 in the memory unit 160*b*, ends the printer driver 30, and displays a rewritable setting screen 48 shown in FIG. 5 on the display 160*c*.

FIG. 5 shows the rewritable setting screen 48 where the user can set either permanent print or rewritable print per page. The rewritable setting screen 48 performs thumbnail view of each page for preview of output result. In this present embodiment, for example, the image forming job consists of 10 pages and the rewritable setting screen 48 shows thumbnail images 52 of the first 4 pages with page number indications 50. A 10 page image forming job is used for description in the present embodiment, however, the job may be a single page image forming job.

The rewritable setting screen 48 can show thumbnail images for page 5 and subsequent pages by a user operation with mouse and keyboard of a page scroll button 54. In this embodiment, the thumbnail image created by the image in the image forming job is used as the thumbnail images 52, however, the present invention is not limited to this. Thumbnail images stored in advance in the rewritable setting screen 48 can be used as the thumbnail images 52.

The rewritable setting screen 48 has a rewritable/permanent setting unit 56 to be able to set either rewritable print or permanent print for each page. The user can set either rewritable print or permanent print to each page independently by operating the rewritable/permanent setting unit 56 and selecting either page rewritable or page permanent with mouse and keyboard. Thus, setting for an image forming job having a mixture of rewritable print and permanent print can be achieved.

Moreover, the rewritable setting screen 48 has a page color setting unit 58 to select color settings per each page. The page color setting unit 58 shows items of, for example, full color, monochrome (black & white or grayscale), monocolor or the like in a dropdown list for selection.

The rewritable setting screen 48 has a page sheet supply setting unit 60 to select media source per page. The page sheet supply setting unit 60 shows items of, for example, auto, new, reuse, manual or the like in a dropdown list for selection.

The reuse means a command to designate a reused sheet having an image once printed by rewritable print and erased and to supply the reused paper from reused sheet supply unit 18b. The new means a command to designate a new sheet and to supply the new paper from the sheet supply unit 18a.

The auto means a command, for example, either to use a sheet supplied from the sheet supply unit 18a if the image data for one page is set to print with full color by permanent print, or to use a reused sheet from the reused sheet supply unit 18b if the image data for one page is set to other settings. The manual means a command to use a sheet supplied from the manual sheet supply unit 18m.

The rewritable setting screen 48, further, has a all page rewritable button 62, a partial rewritable button 64, a OK button 66, and a cancel button 68. The user can set rewritable print to all pages at once by operating the all page rewritable button 62. The user can call a setting screen to set rewritable print portion in a single page by operating the partial rewritable button 64.

By a user operation with the OK button 66, client terminal 160 stores the setting content set in the rewritable setting screen 48 in the memory unit 160b and ends the rewritable setting screen 48. By a user operation with the cancel button 68, client terminal 160 ends the rewritable setting screen 48 without storing the setting content. After ending the rewritable setting screen, the printer driver 30 will be displayed.

Figure 6:
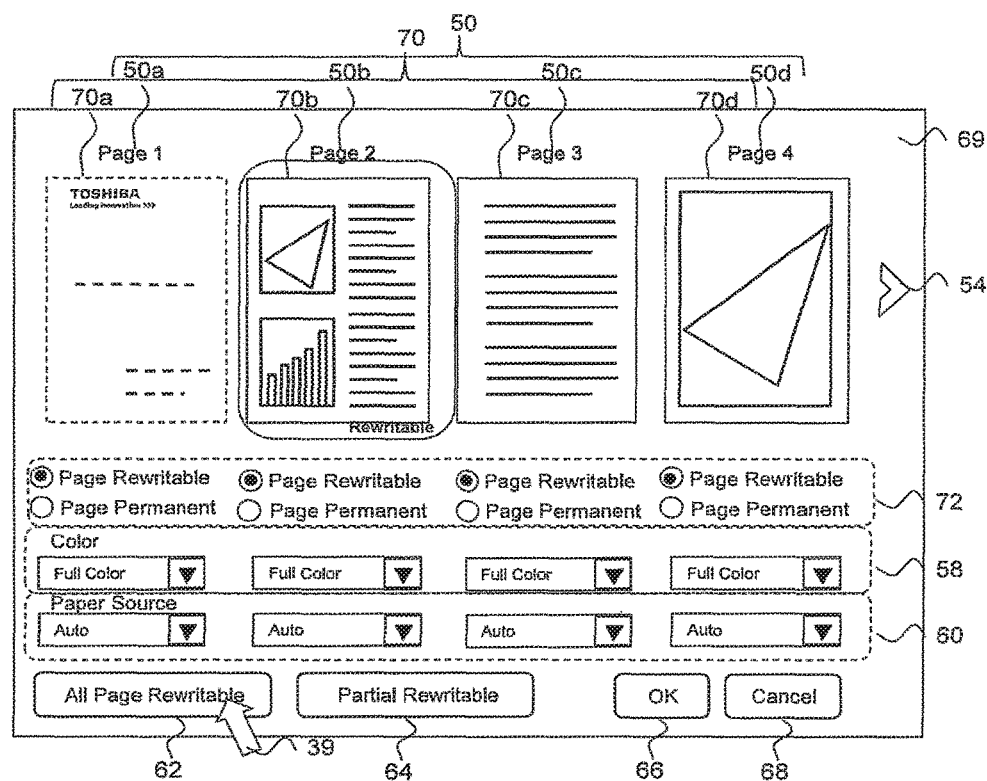
FIG. 6 is an outline view of rewritable setting screen 69 according to the first embodiment.

FIG. 6 shows a rewritable setting screen 69 after some modification in the setting on the rewritable setting screen 48. By a user operation with the all page rewritable 62, rewritable print setting can be achieved at once as shown in rewritable/permanent setting unit 72. At this time, the subsequent pages from page 5 which can be shown by operating the page scroll button 54 are set with rewritable print as well.

The pages set with rewritable print in the rewritable/permanent setting unit 72 have an indication of rewritable print setting or different representation from permanent print setting on the thumbnail views. For instance, the first page shows a thumbnail view of a thumbnail image 70a outlined with dashed lines which were expressed with solid lines when the page was set for permanent print. A thumbnail image 70b has an indication of a word "Rewritable" at the bottom by setting rewritable print.

A thumbnail image 70c is a paled out image by setting rewritable print. A thumbnail image 70d is a blinking image by setting rewritable print. In this embodiment, the rewritable setting screen 69 adds the indication or changes the representation of the thumbnail image in order to make it easier to recognize the setting by the user. The present invention should not be limited to this embodiment, but may include any indication or changes in representing different from permanent setting.

Figure 7:
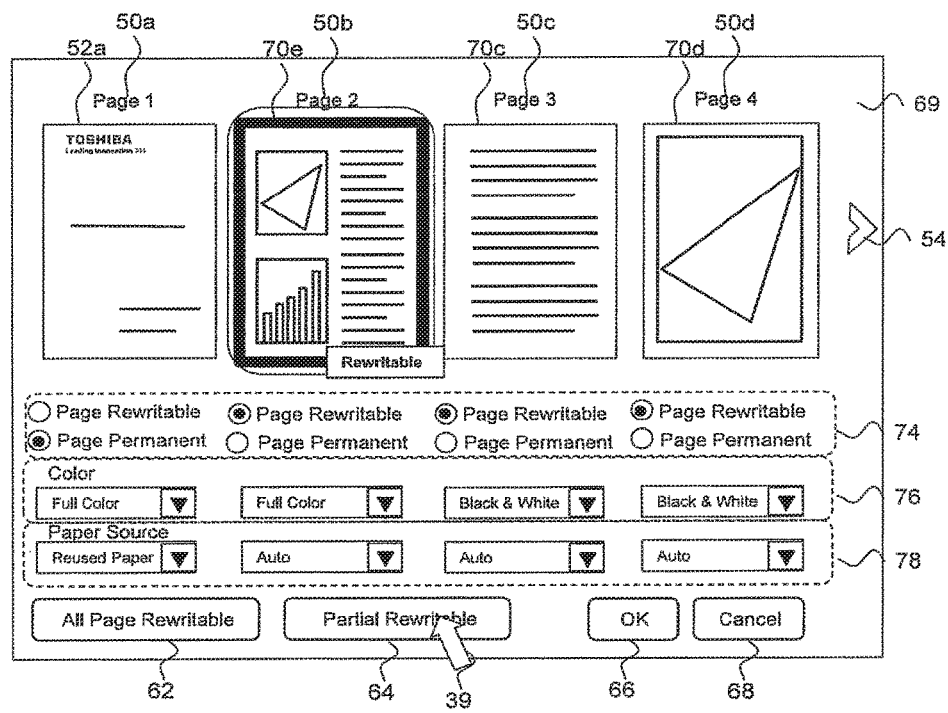
FIG. 7 is an outline view of rewritable setting screen 69 according to the first embodiment.

FIG. 7 shows a rewritable setting screen 69 having further setting changes. As shown in the rewritable/permanent setting unit 74, the user changed the setting for the first page from "Page Rewritable" to "Page Permanent." At this moment, the thumbnail view changes from the thumbnail image 70a for rewritable print setting to the thumbnail image 52a for permanent print setting.

As shown in the page color setting unit 76, the user changed the third and fourth pages from "Full Color" to "Black & White." In this way, the third and fourth pages are set with monochrome by rewritable print. The thumbnail images 52a and 70e are shown in full color due to the full color print setting. The thumbnail images 70c and 70d are shown in grayscale due to the monochrome print setting.

Moreover, as shown in the page sheet supply setting unit 78, the user changed from "Auto" to "Reused Paper" at the first page setting. In this way, a page set with full color by permanent print uses a new sheet supplied from the sheet supply unit 18a in "Auto" setting, which can be changed manually to use a reused paper from the reused sheet supply unit 18b by selecting to "Reused Paper" setting.

As the user selects a specific thumbnail image with the mouse cursor 39, the selected image changes in the appearance indicating the selection. For example, as the user selects the second page by mouse operation, the thumbnail image 70b switches to a thumbnail image 70e rimmed in black. Thus, the second page is indicated to be selected.

Figure 8:
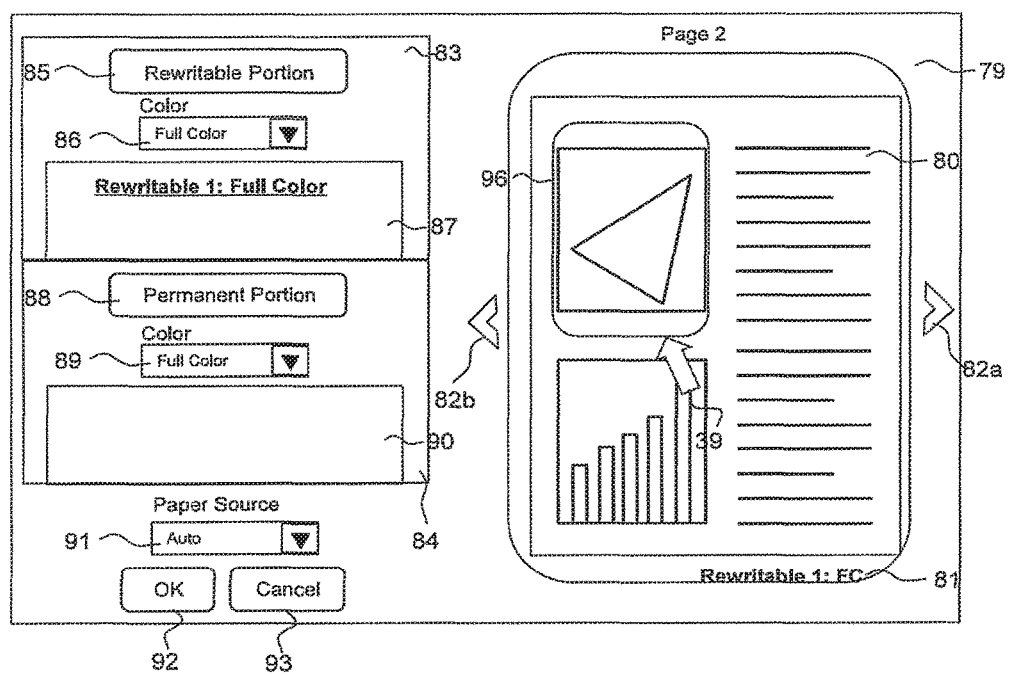
FIG. 8 is an outline view of partial rewritable setting screen 79 according to the first embodiment.
Figure 9:
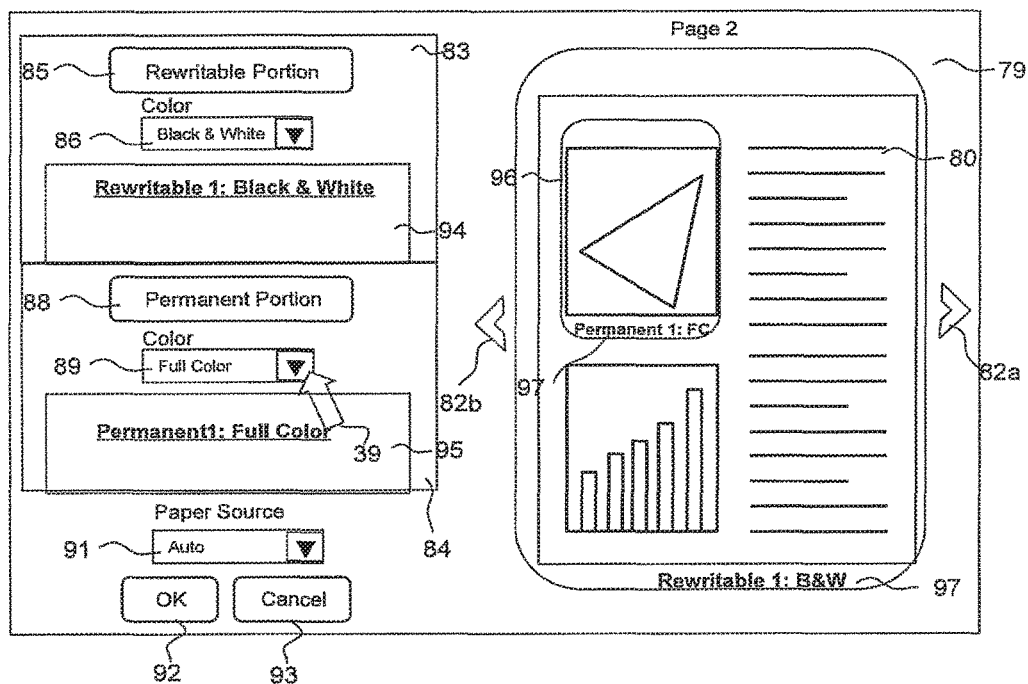
FIG. 9 is an outline view of partial rewritable setting screen 79 according to the first embodiment.

With the second page selected, as user operates the partial rewritable button 64 by mouse, the client terminal 160 stores the setting content set in the rewritable setting screen 69 in the memory unit 160b, ends the rewritable setting screen 69, and displays a partial rewritable setting screen 79 shown in FIG. 8. This operation can be achieved as well by double-clicking the thumbnail image 70e of the second page.

FIG. 8 shows the partial rewritable setting screen 79 to set rewritable print or permanent print per segment in a single page. The partial rewritable setting screen 79 displays the thumbnail image 80 of the second page which was selected in the rewritable setting screen 69 in FIG. 7. The thumbnail image 80 has setting indicator 81 indicating a setting of full color by rewritable print as set in the rewritable setting screen 69. By operating a page scroll button 82 with mouse or the like, a previous or next page can be shown.

The partial rewritable setting screen 79 further has a partial rewritable setting unit 83 and partial permanent setting unit 84. The partial rewritable setting unit 83 has a partial rewritable button 85, a partial color setting unit 86, and a partial rewritable item view 87. The partial rewritable item view 87 shows a list of segments set with partial rewritable print setting. In FIG. 8, as the whole page 2 is set with full color by rewritable print indicated by the setting indicator 81, an indication corresponding to the setting is listed in the partial rewritable item view 87.

The partial permanent setting unit 84 has a partial permanent button 88, a partial color setting unit 89, and a partial permanent item view 90. The partial permanent item view 90 shows a list of segments set with partial permanent print setting. In FIG. 8, since there is no segment set with partial permanent print setting, there is no item listed in the partial permanent item view.

The partial rewritable setting screen 79 further includes, a page sheet supply setting unit 91 to select sheet source per page, a OK button 92, and cancel button 93. By operating the OK button 92 by the user, client terminal 160 stores the setting content set in the partial rewritable setting screen 79 in the memory unit 160b and ends the partial rewritable setting screen 79. By operating the cancel button 93, the client terminal 160 ends the partial rewritable setting screen 79 without storing the setting content set in the partial rewritable setting screen 79. After ending the partial rewritable setting screen, the rewritable setting screen 69 will be displayed.

FIG. 8 shows that the user selects an image in upper left of the second page by mouse operation. For example, the user designate an area 96 including the image located in the upper left portion of the second page by mouse cursor 39.

FIG. 9 shows a partial rewritable setting screen 79 after some modification in setting by the user. After selecting the area 96 by mouse operation, the user can set the area 96 with full color by permanent print by operating the partial permanent setting button 88 and the partial color setting unit 89 with mouse, which will be indicated as a setting indicator 97. Then, as shown in the partial permanent item view 95, the setting assigned to the area 96 is indicated as well.

The user can reset the items in which setting has been made, by operating the items shown in the item view 94 and 95. For example, the user selects the item "Rewritable 1" in the partial rewritable item view 94 and changes from full color to black & white in the partial color setting unit 86. At this moment, as shown in the setting indicator 97, the appearance and the indication changes in accordance with the changes in setting. It is preferable that the segment set with black & white and the segment set with full color are represented in the setting color in the thumbnail image 80 of the page.

Figure 10:
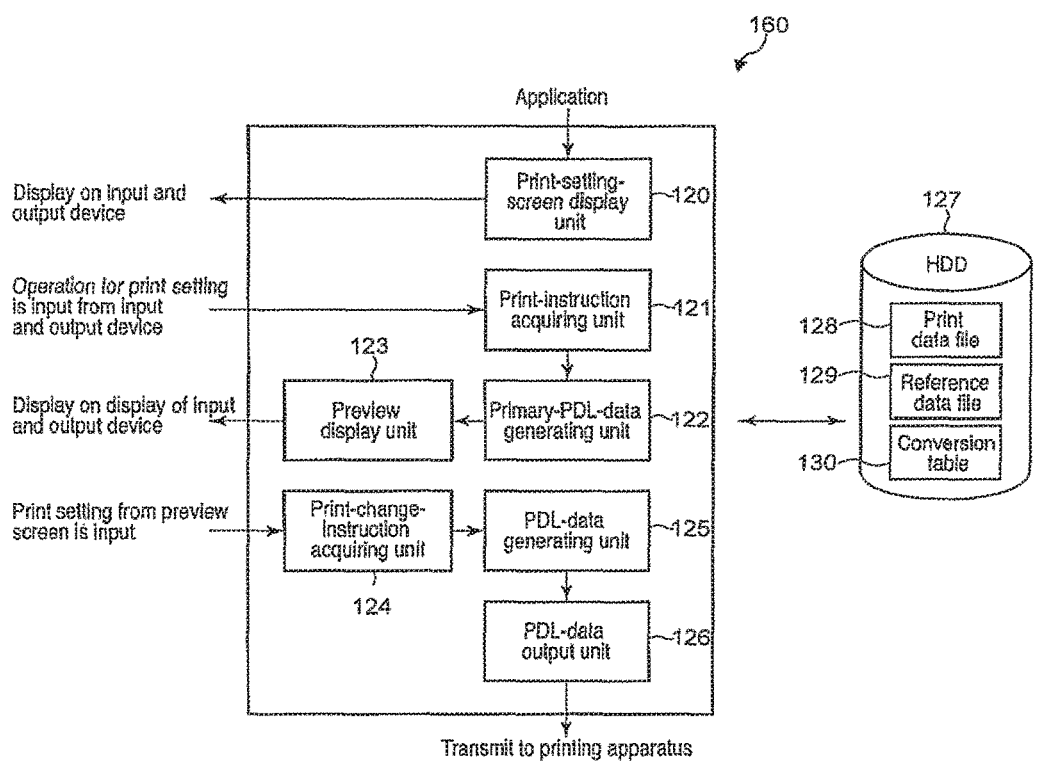
FIG. 10 is a functional block diagram showing function of client device 160 according to the first embodiment.

FIG. 10 is an exemplary view showing a diagram of the configuration of the client terminal 160 and a flow of processing thereof according to the embodiment. The client terminal 160 includes a print-setting-screen display unit 120, a print-instruction acquiring unit 121, a primary-PDL-data generating unit 122, a preview display unit 123, a print-change-instruction acquiring unit 124, a PDL-data generating unit 125, and a PDL-data output unit 126. The HDD 127 stores a print data file 128, a reference data file 129, and a conversion table 130.

The print-setting-screen display unit 120 is started from a document creation application and displays the printer driver 30, rewritable setting screen 48, and partial rewritable setting screen 79 on the display 160c of the client terminal 160. The print-instruction acquiring unit 121 acquires print setting content input by the user. The print setting content is set for an entire document as explained above. The primary-PDL-data generating unit 122 generates a primary PDL (Page Description Language) data according to the print setting content.

The preview display unit 123 displays the preview screen 35, 52, 70, and 80 shown in FIGS. 4 to 9. The print-change-instruction acquiring unit 124 acquires print setting data in page units input from the preview screen 35, 52, 70, and 80, feeds back the data to the preview display unit 123, and causes the preview display unit 123 to update the preview screen 35, 52, 70, and 80. When a color is changed on an update screen, the preview display unit 123 converts, referring to the conversion table 130 provided in the HDD 127, a color to be displayed.

When a print request button not shown is depressed, the print-change-instruction acquiring unit 124 starts the PDL-data generating unit 125. The PDL-data generating unit 125 generates PDL data on the basis of the primary PDL data and the print setting data changed by the user. The PDL-data output unit 126 outputs the generated PDL data to the MFP 1.

Figure 11:
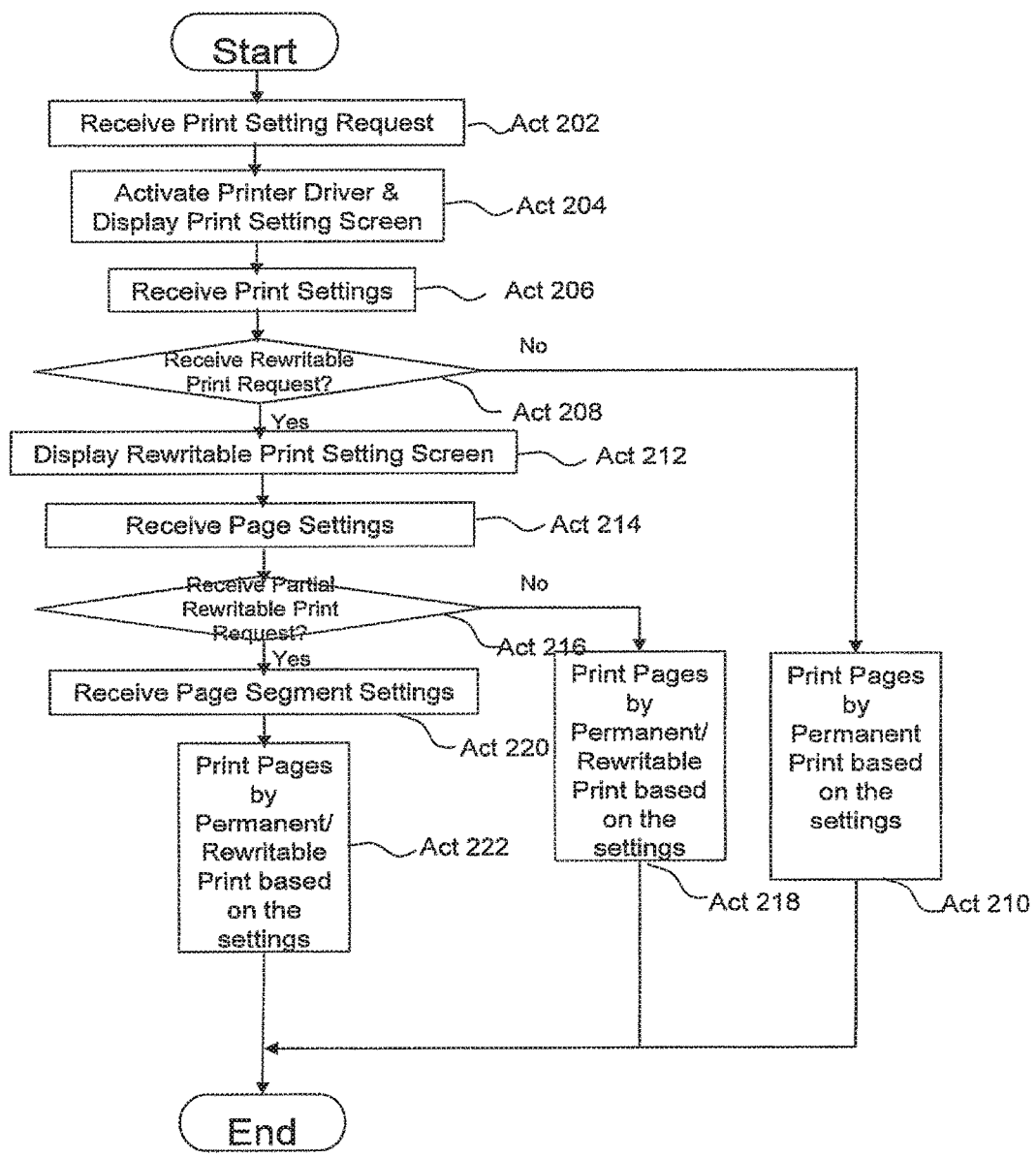
FIG. 11 is a flowchart showing the flow of an image forming by client terminal 160.

FIG. 11 is a flowchart showing the flow of creating an image forming job by the client terminal 160 and forming the image by the MFP 1. At first, when the user prepares an image forming job based on an image created with the application software in the client terminal 160, the client terminal 160 receives a print setting request from the user at Act 202.

At Act 204, the client terminal 160 activates the printer driver 30 and displays a setting screen upon receipt of the print setting request. At Act 206, the client terminal 160 receives print settings through the setting screen from the user.

At Act 208, after setting the print settings, the client terminal 160 determines if there is a rewritable print request in the print settings. If there is no rewritable print request, the client terminal 160 transmits the print settings to the MFP 1 and the MFP 1 prints all pages in the image forming job by permanent print based on the received and stored print settings.

At Act 208, if there is a rewritable print request in the print settings, the client terminal 160 displays a rewritable setting screen. At Act 214, the client terminal 160 receives a print setting per page through the setting screen from the user.

At Act 216, after setting the rewritable print setting, the client terminal 160 determines if there is a partial rewritable print request in the rewritable print setting. If there is no partial rewritable print request, the client terminal 160 transmits the settings to the MFP 1 and the MFP 1 prints all pages in the image forming job by permanent print or rewritable print based on the received and stored print settings.

At Act 216, if there is a partial rewritable print request in the print settings, the client terminal 160 displays a partial rewritable setting screen. At Act 220, the client terminal 160 receives a print setting per segment through the setting screen from the user. At Act 222, the client terminal 160 transmits the settings to the MFP 1 and the MFP 1 prints all segments in the image forming job by permanent print or rewritable print based on the received and stored print settings.

Although the present embodiment was described such that image formation is performed by rewritable print and permanent print when an image forming job is designated to be performed by a mixture of rewritable print and permanent print, image formation may be performed by rewritable print and permanent print similarly when an image is formed based on a received FAX document or copying a document.

In this case, a user may input settings so that an image of a FAX document and a copied document will be formed by rewritable print and/or permanent print through an operation input on the operation input unit 16 or the like.

Furthermore, although the present embodiment was described such that the decolorable colorant is decolored with heat, the invention is not limited to this, the decolorable colorant may be a colorant that is decolored with light energy and may be a colorant that is decolored by reacting with other materials.

Furthermore, although the present embodiment was described such that the MFP 1 has an entirety of the image forming function in the rewritable print, the invention is not limited to this, but an external device such as the client terminal 160 may have a part of the function. In this case, a program corresponding to the function realized in the terminal 160 may be stored in the memory unit 160*b* or the like so that the function of the terminal 160 is realized when the processor 160*a* executes the program.

Figure 12:
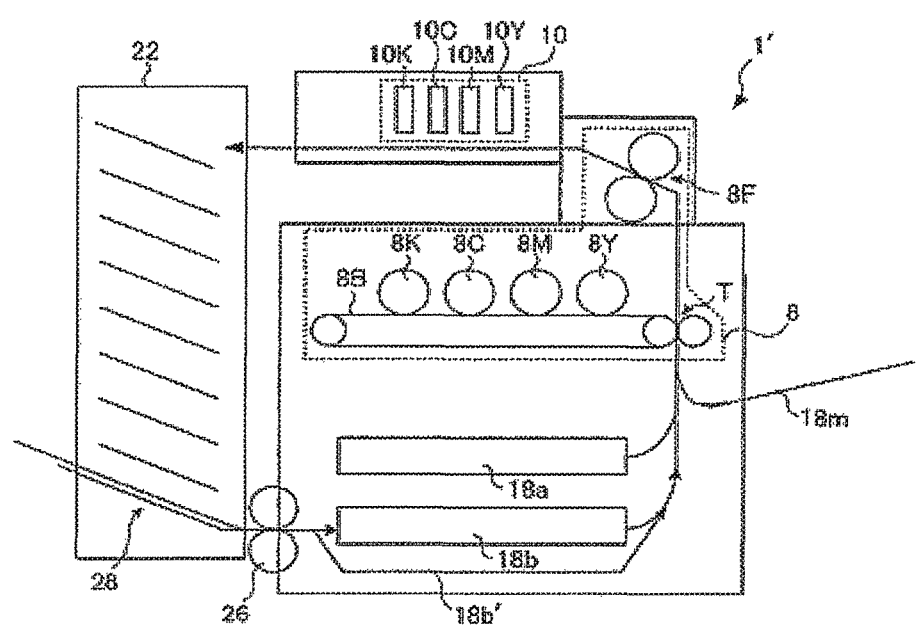
FIG. 12 is a diagram showing the configuration of MFP 1' according to a modification of the first embodiment.

In addition, as another modification, as shown in FIG. 12, an MFP 1' may be configured to include a decoloring device 26 that is disposed to be close to the reused sheet supply unit 18*b* so as to decolor an image on a sheet formed with a decolorable colorant and an image formed sheet supply unit 28 that is disposed below the finisher device 22 so as to store sheets on which images are formed with a decolorable colorant, and that has a function of sequentially supplying the sheets to the decoloring device 26.

The decoloring device 26 is a device that decolors images formed on a sheet with a decolorable colorant by heating the sheet to a temperature equal to or higher than a temperature at which the decolorable colorant becomes colorless.

Second Embodiment

Next, a second embodiment will be described. An MFP 1*b* of the present embodiment is configured to perform both image formation with a non-decolorable colorant and image formation with a decolorable colorant by an electrophotographic method. In the following, the MFP 1*b* of the present embodiment will be described, and the same configuration as the above-described embodiments will be denoted by the same reference numerals and description thereof will be omitted.

Figure 13:
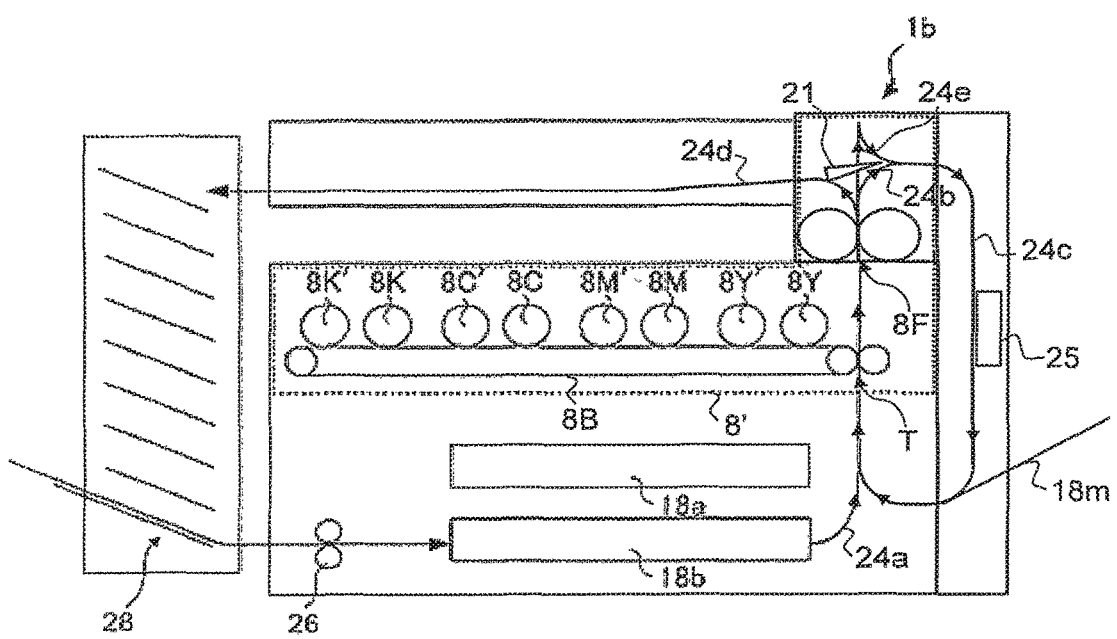
FIG. 13 is a diagram showing the configuration of MFP 1b according to a second embodiment.

FIG. 13 is a diagram showing the configuration of the MFP 1*b* according to the present embodiment. The MFP 1*b* of the present embodiment includes an image forming unit 8' that is made up of the photoconductive drums 8K to 8Y that use a non-decolorable colorant and constitute the first image forming unit 8 of the first embodiment and photoconductive drums 8K', 8C', 8M', and 8Y' that are disposed to be adjacent to each of the photosensitive drums 8K to 8Y so as to form a developer image with a decolorable colorant. The photoconductive drums 8K', 8C', 8M', and 8Y' of the image forming unit 8' are configured to form a developer image with decolorable colorants of the colors black, cyan, magenta, and yellow, respectively.

Therefore, in the MFP 1*b* of the present embodiment, when image formation is performed by rewritable print and permanent print, image data for rewritable print is formed with a developer image formed by the photoconductive drums 8K' to 8Y' that use a decolorable colorant, and image data for permanent print is formed with a developer image formed by the photoconductive drums 8K to 8Y that use a non-decolorable colorant. That is to say, a developer image is formed on the photoconductive drums 8K' to 8Y' with a decolorable colorant based on the image data for rewritable print, and a developer image is formed on the photoconductive drums 8K to 8Y with a non-decolorable colorant based on the image data for permanent print.

The developer image formed with the non-decolorable colorant and the developer image formed with the decolorable colorant are transferred (primarily transferred) from the respective photoconductive drums 8K to 8Y and 8K' to 8Y' to the intermediate transfer belt 8B. In this way, an image that is formed with the decolorable colorant and the non-decolorable colorant are formed on the intermediate transfer belt 8B. The developer image is transferred (so-called secondarily transferred) to a sheet at a transfer position T, and the developer image on the sheet is thermally fixed to the sheet by the fixing device 8F. As described above, the MFP 1*b* of the present embodiment is able to form the image formed with the decolorable colorant and with the non-decolorable colorant at the same time through one process involving transferring and heat-fixing of a developer image to the sheet.

In case that the decoloring temperature is higher than the fixing temperature, as described above, the transferring of the decolorable colorant and the non-decolorable colorant can be achieved at once. That is to say, for example, even though the fixing temperature is about 150° C., if the decoloring temperature is more than 180° C., the developer image with the decolorable colorant, which is transferred to the sheet at the transfer position T, does not get decolored even after being fixed at about 150° C. in the fixing device 8F.

In the other hand, hereinafter, the case that the decoloring temperature is lower than or equal to the fixing temperature will be described. For instance, the fixing temperature is about 150° C. while the decoloring temperature is about 100° C. In this case, an image forming of the image with the decolorable colorant should be performed separately from an image forming of the image with the non-decolorable colorant.

At first, a reused sheet supplied from the reused sheet supply unit 18*b* is conveyed in a convey path 24. In the meantime, a developer image formed with the non-decolorable colorant is transferred (primarily transferred) from the respective photoconductive drums 8K to 8Y to the intermediate transfer belt 8B. Then, at the transfer position T, the developer image on the intermediate transfer belt 8B is transferred (secondarily transferred) on the conveyed sheet. After that, the developer image on the sheet is heat-fixed on the sheet at about 150° C. by the fixing device 8F. The fixed sheet is led to a convey path 24*b* by a convey path changer 21 and is conveyed in a convey path 24*c*. During being conveyed in the convey path 24*c*, the sheet gets cooled down, however, a cooling device 25 can be newly installed to make sure that the temperature of the sheet becomes less than about 100° C. of the decoloring temperature.

While the sheet is conveyed in the convey path 24*c*, a developer image formed with the decolorable colorant is transferred (primarily transferred) from the respective photoconductive drums 8K' to 8Y' to the intermediate transfer belt 8B. Then, at the transfer position T, the developer image on the intermediate transfer belt 8B is transferred (secondarily transferred) on the conveyed sheet. After that, the developer image on the sheet is heat-fixed on the sheet at about 80° C. by the fixing device 8F. The fixed sheet is led to a convey path 24*d* by the convey path changer 21 and is discharged to an output tray of the finisher 22.

Hereinafter, the case of duplex print will be described. As described above, in case there is a request to print another side of a sheet after an image is formed on one side of the sheet, the sheet is led to a convey path 24e by the convey path changer 21 and has a switchback there. In this way, at the transfer position T, another developer image can be transferred to another side of the sheet conveyed in the convey path 24c subsequently. Thus, this duplex print can be performed.

Figure 14:
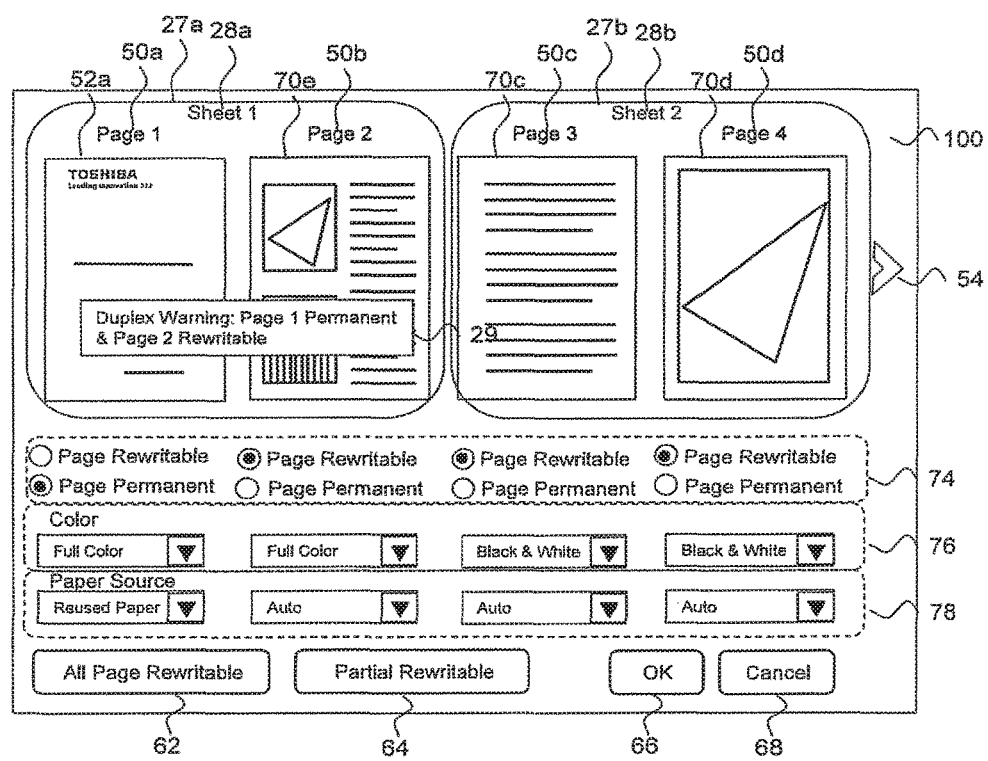
FIG. 14 is an outline view of rewritable setting screen 26 according to the second embodiment.

The duplex print setting can be set in the finishing tab in the printer driver 30. At the finishing tab, the user can set a Nin1 setting, a stapling setting, and a punching setting other than the duplex print setting. FIG. 14 shows a rewritable setting screen 100 after setting the duplex print setting in the printer driver 30.

The rewritable setting screen 100 has a duplex print sheet indicator 27 encompassing the pages to be printed on one sheet and a duplex print sheet number 28 in response to the duplex print setting. The first page 52a and the second page 70e are printed on one sheet due to the duplex print so they are encompassed by the duplex print sheet indicator 27a with the duplex print sheet number 28a of "Sheet 1."

Here, the first page 52a and the second page 70e are set by permanent print and by rewritable print respectively, therefore, a warning window 29 is popped up in the duplex print sheet indicator 27a. This is to notify the user that the setting will lead to deteriorate the availability of reuse of the sheet because one side is made by rewritable print while the other side is made by permanent print.

The rewritable setting screen 100 can be configured so that the user can remove the duplex print setting on the first and second pages by manipulating the duplex print sheet indicator 27a. In this embodiment, the case with duplex print setting for one sheet with one side by permanent print and the other side by rewritable print is explained, however the present invention should not be limited to this, but the case with Nin1 setting for one sheet with one side by permanent print and the other side by rewritable print may be treated in the same way.

Figure 3:
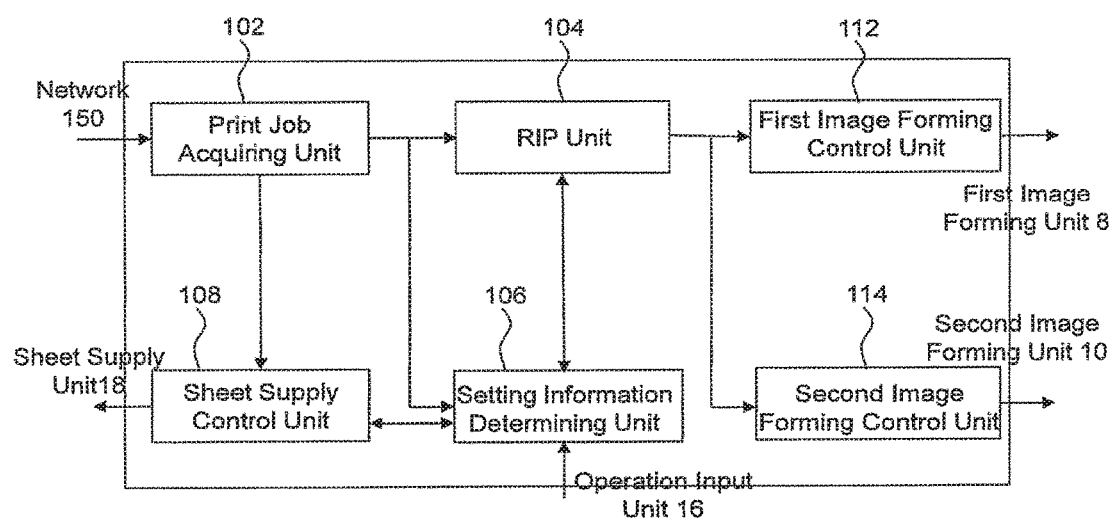
FIG. 3 is a functional block diagram showing functional blocks of the MFP 1 according to the first embodiment.

The functional blocks of the MFP 1b of the present embodiment are the same as the functional blocks of the MFP 1 of the first embodiment shown in FIG. 3. However, the first image forming unit control unit 112 controls the photoconductive drums 8K to 8Y corresponding to the first image forming unit 8 to perform image formation with a non-decolorable colorant, and the second image forming unit control unit 114 controls the photoconductive drums 8K' to 8Y' corresponding to the second image forming unit 10 to perform image formation with a decolorable colorant. Moreover, other function such as the intermediate transfer belt 8B and the fixing device 8F may be controlled either by the first image forming unit control unit 112 or the second image forming unit control unit 114.

In addition, a program that causes a computer constituting an image forming apparatus to execute the above-described operations can be provided as an image forming program. Although the present embodiment was illustrated such that the program for realizing the functions implementing the invention is recorded in advance in a storage region provided in the apparatus, the invention is not limited to this. A similar program may be downloaded to the apparatus from a network, or a similar program stored in a computer-readable recording medium can be installed in the apparatus. The recording medium may be in any form that can store a program and can be read by a computer. Specifically, such recording media may include, for example, internal storage devices arranged within a computer such as ROM and RAM, portable storage media such as CD-ROM, flexible disk, DVD disk, magneto-optical disk and IC card, database which holds computer programs, another computer and its database, and a transmission medium on a network line. The functions that can be acquired in advance by installation and downloading may be realized in cooperation with the OS (operating system) in the apparatus.

A part or an entirety of the program may be an execution module that is dynamically generated.

The invention can be embodied in a variety of other forms without departing from the spirit or major features thereof. Therefore, the embodiments described above are exemplary only in all respects, and are not intended to limit the scope of the invention. The scope of the invention should be defined by the accompanying claims and should not be restricted to the main body of the specification. Furthermore, all changes, various improvements, substitutions and alterations made within the equivalent range of the claims would fall within the scope of the invention.

What is claimed is:

1. An image forming apparatus comprising:
a facsimile unit configured to receive a facsimile signal carrying image data of a facsimile;
a processor and a memory configured to store a program which, when executed by the processor, causes the processor to
communicate with the facsimile unit, and to cause a facsimile image job to be created and transmitted based on the received facsimile signal, and
receive a request of a print setting for the facsimile image job to be printed,
a display configured to display a setting screen to selectively designate a setting of rewritable printing and/or permanent printing for the facsimile image job,
wherein the memory is configured to
store the setting of rewritable and/or permanent printing for the facsimile image job set by operating the setting screen, and
store the image for the facsimile image job; and
an electrophotographic device to receive the facsimile image job from the memory, to receive one or more sheets decolored by a decoloring device, and to form images on the one or more decolored sheets based on the facsimile image job, the electrophotographic device including
a first electrophotographic device configured to form rewritable print images by discharging decolorable colorant onto the one or more decolored sheets when the setting designates rewritable printing, and
a second electrophotographic device configured to form permanent print images by discharging non-decolorable colorant onto the one or more decolored sheets when the setting designates permanent printing,
wherein the colorant is either one of ink or toner,
wherein the processor is configured to receive an inputted setting of a single job containing both permanent and rewritable print images, the inputted setting being a setting selected by a user to print at least a rewritable print image on a portion of a single page,
wherein, in response to the inputted setting of the single job containing both rewritable and permanent print images, the processor is configured to cause the first electrophotographic device to form a rewritable print image in the single job and to cause the second electrophotographic device to form a permanent print image in the single job, according to the single job for which the inputted setting is received,
wherein when the single job includes a page to be formed with full color by permanent printing, the processor is configured to cause a first sheet supply source to supply an unused sheet to form a full color image by permanent printing thereon, and wherein when the single job includes a page to be formed without full color by permanent printing, the processor is configured to cause a second sheet supply source to supply a reused sheet to form images other than full color by permanent printing thereon.

2. The image forming apparatus of claim 1, wherein the first and second electrophotographic devices are configured to form rewritable and permanent print images, respectively, at a same time, in response to the inputted setting selected by the user.

3. The image forming apparatus of claim 1, further comprising:
a first sheet supply unit configured to store one or more sheets decolored by the decoloring device;
a second sheet supply unit configured to store one or more sheets on which rewritable print images are formed, and to supply the one or more sheets to the decoloring device,
wherein the decoloring device is disposed between the first and second sheet supply units.

4. The image forming apparatus of claim 1, wherein the processor is configured to receive a setting to designate a rewritable print image to be in full color or partial color.

5. The image forming apparatus of claim 1, wherein the decolorable colorant comprises leuco dye.

6. A system, comprising:
a facsimile apparatus configured to receive a facsimile signal carrying image data of a facsimile;
a first electrophotographic device configured to discharge decolorable colorant onto a sheet to form a rewritable print image;
a second electrophotographic device configured to discharge non-decolorable colorant onto a sheet to form a permanent print image;
a processor and a memory configured to store a program which, when executed by the processor, causes the processor to
control the first and second electrophotographic devices,
determine whether a facsimile image job based on the received facsimile signal includes image data to be formed by rewritable printing or permanent printing,
upon determining that the facsimile image job includes image data to be formed by rewritable printing, instruct a raster image processor to output the image data to be formed by rewritable printing to the first electrophotographic device, and
upon determining that the facsimile image job includes image data to be formed by permanent printing, instruct the raster image processor to output the image data to be formed by permanent printing to the second electrophotographic device,
wherein the colorant is either one of ink or toner,
wherein the processor is configured to receive an inputted setting of a single job containing both permanent and rewritable print images, the inputted setting being a setting selected by a user to print at least a rewritable print image on a portion of a single page,
wherein, in response to the inputted setting of the single job containing both rewritable and permanent print images, the processor is configured to cause the first electrophotographic device to form a rewritable print image in the single job and to cause the second electrophotographic device to form a permanent print image in the single job, according to the single job for which the inputted setting is received, wherein when the single job includes a page to be formed with full color by permanent printing, the processor is configured to cause a first sheet supply source to supply an unused sheet to form a full color image by permanent printing thereon, and wherein when the single job includes a page to be formed without full color by permanent printing, the processor is configured to cause a second sheet supply source to supply a reused sheet to form images other than full color by permanent printing thereon.

7. The system of claim 6, wherein the memory is configured to store image data received from the raster image processor.

8. The system of claim 6, further comprising:
a first sheet supply configured to store unused sheets on which no image is formed;
a second sheet supply configured to store reused sheets subjected to decoloration, and
a third sheet supply configured to store sheets supplied manually.

9. The system of claim 6, wherein the second electrophotographic device comprises:
a plurality of photoconductive drums configured to form electrostatic latent images;
a developer roller configured to supply developer to the electrostatic latent images to form developer images;
a transfer belt configured to receive the developer images and to transfer the developer images to a sheet; and
a fixer configured to thermally fix the developer images transferred to the sheet.

10. The system of claim 9, wherein the fixer is configured to thermally fix the developer images by heat fixing the developer images to the sheet at about 150° C.

11. The system of claim 6, wherein the first electrophotographic device comprises a plurality of print heads containing a respective plurality of decoloring inks, wherein the print heads are configured to discharge the decoloring inks to form decolorable images.

12. The system of claim 9, further comprising a cooling fan disposed in a path between the fixer and the first electrophotographic device.

13. The system of claim 12, wherein:
the second electrophotographic device is configured to convey a sheet on which an image is fixed by the fixer to the first electrophotographic device, and
the cooling fan is configured to cool the sheet on which the image is fixed by the fixer to about 60° C. during conveyance of the sheet to the first electrophotographic device.

14. An image forming method, comprising:
receiving facsimile image data from a facsimile unit;
creating and transmitting a facsimile image job based on the received facsimile data;
receiving a request of a print setting for the facsimile image job and a setting of rewritable printing and/or permanent printing for the facsimile image job, which setting is set by a user;
storing, in a memory, the setting of rewritable and/or permanent printing for the facsimile image job, and storing the image for the facsimile image job;
receiving one or more sheets decolored by a decoloring device;
forming rewritable print images by discharging decolorable colorant onto the one or more decolored sheets when the setting designates rewritable printing;

forming permanent print images by discharging non-decolorable colorant onto the one or more decolored sheets when the setting designates permanent printing, receiving an inputted setting of a single job containing both permanent and rewritable print images, the inputted setting being a setting selected by a user to print at least a rewritable print image on a portion of a single page, in response to the inputted setting of the single job containing both rewritable and permanent print images, forming a rewritable print image in the single job and forming a permanent print image in the single job, according to the single job for which the inputted setting is received, when the single job includes a page to be formed with full color by permanent printing, causing a first sheet supply source to supply an unused sheet to form a full color image by permanent printing thereon, and when the single job includes a page to be formed without full color by permanent printing, causing a second sheet supply source to supply a reused sheet to form images other than full color by permanent printing thereon, wherein the colorant is either one of ink or toner.

15. The image forming method of claim 14, further comprising forming rewritable and permanent print images at a same time.

16. The image forming method of claim 14, further comprising receiving a setting to designate a rewritable print image to be in full color or partial color.

17. The image forming method of claim 14, wherein the decolorable colorant comprises leuco dye.

18. The image forming method of claim 16, further comprising decoloring the decolorable colorant by applying any one of heat, light energy, or materials.

* * * * *